United States Patent [19]

Edelman

[11] 4,192,933

[45] Mar. 11, 1980

[54] NON-PULVERULENT SOLID POLYMERIC STRUCTURE

[75] Inventor: Leonard E. Edelman, Penn Hills Township, Allegheny County, Pa.

[73] Assignee: Westinghouse Electric Corp., Pittsburgh, Pa.

[21] Appl. No.: 911,253

[22] Filed: May 31, 1978

Related U.S. Application Data

[62] Division of Ser. No. 727,481, Sep. 28, 1976, abandoned.

[51] Int. Cl.² ............................. C08F 8/30; C08F 8/32
[52] U.S. Cl. .................................... 525/377; 525/379; 525/382
[58] Field of Search ........................ 526/52, 52.2, 52.5

[56] References Cited

U.S. PATENT DOCUMENTS 2,826,567  3/1958  Brusan .................................. 526/49

OTHER PUBLICATIONS

Yuki Gosei Kagaku, vol. 24, No. 2, 1966, pp. 125-131; Nomura et al., Reactions of Vinyl Polymers.
Chemical Abstracts, vol. 64, p. 12826h, Nomura et al.

*Primary Examiner*—William F. Hamrock
*Attorney, Agent, or Firm*—R. D. Fuerle

[57] ABSTRACT

A non-pulverulent solid polymeric structure is disclosed which has at least one pendant diaminotriazine ring. The structure is made by immersing a non-pulverulent solid structure which has at least one pendant nitrile group into a basic solution of cyanoguanidine at a temperature which does not dissolve the structure.

9 Claims, No Drawings

NON-PULVERULENT SOLID POLYMERIC STRUCTURE

This is a division of application Ser. No. 727,481 filed Sept. 28, 1976, now abandoned.

BACKGROUND OF THE INVENTION

Commercial polymeric structures which have pendant nitrile groups include fibers made from polyacrylonitrile sold by Dupont under the trademark "Orlon," and fibers made from copolymers of acrylonitrile with various other vinyl monomers which are not disclosed to the public, such as "Verel" and "Dow 507," made by Dow Chemical Company, and "Acrilan," made by Monsanto.

Though these fabrics have many outstanding properties which have made them very successful commercially, they are nevertheless lacking in some respects. "Orlon," for example, will burn when ignited and "Verel," though fire retardant, is difficult to iron due to its low melting point.

Efforts have been made to modify powdered polyacrylonitrile in solution, but then the modified polyacrylonitrile cannot be made into a fiber because its melting point is now at or close to its decomposition temperature. Efforts to produce a vinyl triazine monomer which could then be polymerized to produce a modified polyacrylonitrile have been unsuccessful due to side reactions which prevent the formation of the monomer.

PRIOR ART

Chemical Abstracts, volume 64, page 12826h abstracts an article by Nomura, Yoshida, Kakurai, and Noguchi in Yuki Gosei Kagaku Kyokaie Shi in which powdered polyacrylonitrile was dissolved in a solution of cyanoguanidine (dicyandiamide) to produce polyacrylonitrile having a pendant diaminotriazine ring.

SUMMARY OF THE INVENTION

I have found that polyacrylonitrile and copolymers thereof in a non-pulverulent solid form can be modified by immersion without dissolution in a basic solution of cyanoguanidine (dicyandiamide). The modification results in the formation of diaminotriazine rings from pendant nitrile groups which increases melting point and fire retardancy.

DESCRIPTION OF THE INVENTION

The polymers used in this invention must have at least one pendant nitrile group. The two commercial polymers which have pendant nitrile groups are polyacrylonitrile, which has the repeating group

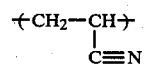

and polymethacrylonitrile, which has the repeating group

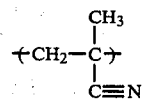

Copolymers of acrylonitrile and methacrylonitrile with each other or with other vinyl monomers such as styrene, polyvinyl chloride, methyl methacrylate, vinyl toluene, etc., may also be used in this invention.

The invention is concerned with modifying the properties of a polymer which has already been formed into a structure such as a fiber (single, roving, mat, or woven), a film, a coating, or a shape. Primarily, however, the invention is concerned with fibers, particularly woven fibers, because the invention affects the properties of fibers to a much greater extent than it does the properties of other structures. For example, "Orlon," a pure polyacrylonitrile fiber sold by Dupont is made more fire retardant. "Verel," a copolymer fiber of acrylonitrile and polyvinyl chloride is already fire retardant, but the process of this invention increases its melting point and makes it easier to iron.

The polymer is immersed in a basic solution of cyanoguanidine causing the nitrile groups to form diaminotriazine rings according to the equation:

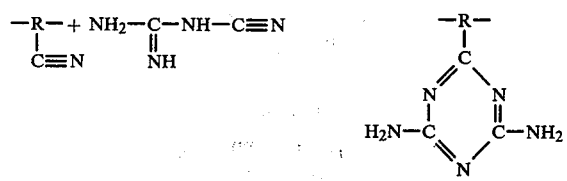

(The structure of the triazine ring is a postulated structure based on its empirical formula). The term "diaminotriazine ring" is intended to cover the structure

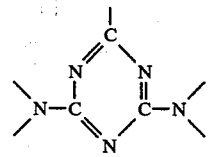

That is, it includes substitutions on the amine groups, which may be produced by reacting the unsubstituted ring with compounds such as formaldehyde. However, the properties of such further modified polymers have not yet been investigated.

It has been found that compounds such as monomethyl dicyandiamide cannot be substituted for cyanoquanidine, and therefore the invention is limited to cyanoguanidine. The solvent used in the solution is a solvent for cyanoguanidine, which is a solid at room temperature. Suitable solvents for cyanoguanidine include N-methyl pyrrolidone, dimethylacetamide, triethylene glycol, morpholine, and cellosolve. Morpholine is useful because it is already basic, but N-methyl pyrrolidone is preferred because it is inexpensive. The solution should be concentrated as dilute solutions only result in slower reactions.

The solution must be basic for the reaction to proceed. A pH of about 8 to about 10 is preferred as at less than about 8 the reaction is slow and at more than 10 the cyanoguanidine may decompose. A basic pH may be obtained by using a basic solvent such as morpholine or by adding a base such as an alkali metal hydroxide, guanidine carbonate, or quaternary ammonium hydroxide. Guanidine carbonate is preferred because it is soluble in most of the solvents for cyanoguanidine.

The maximum temperature of the solution depends on the solubility of the polymer. "Verel," for example, must be treated at a low temperature (e.g. 60° C.) because it is very soluble in the solvents, but other fibers such as "Orlon," "Dow 507," and "Acrilan" can be treated at 100° C. A maximum temperature is about 120° C. because cyanoguanidine begins to decompose in that region. Lower temperatures can, of course, be used, but reaction times are longer.

The time of immersion in the solution depends upon how extensively it is desired to modify the polymers. For example, polyacrylonitrile is difficult to dye and only a brief immersion (e.g. about 10 to about 30 minutes) will make it more dyeable. However, if it is desired to make it self-extinguishing a longer immersion is necessary and a still longer immersion is needed to make it non-burning. The immersion time also depends upon the particular fabric and solvent since fibers of differing thicknesses, molecular weight, etc. will react to differing extents in the same time period. To make "Verel" fabrics more ironable, a short immersion can be used. After immersion the polymer is removed, washed in water or other cleaning fluid, and dried.

The following examples further illustrate this invention.

EXAMPLE 1

Samples of a fabric woven from an acrylonitrile polymer fiber sold by Monsanto under the trademark "Acrilan C" were weighed and immersed in a solution of 25% by weight cyanoguanidine and 75% by weight morpholine at 100° C. The following table gives the time of immersion, the weight gain, and the flammability.

| Time (hours) | % weight gain | Flammability |
| --- | --- | --- |
| 2 | 6.8 | burns rapidly |
| 4 | 11.7 | burns rapidly |
| 6 | 45.4 | burns |
| 8 | — | — |
| 10 | 53.0 | self-extinguishing |
| 13 | 60.4 | self-extinguishing |
| 18 | 71.8 | non-burning |
| 21 | 91.2 | non-burning, stiff, and board-like |

EXAMPLE 2

Samples of a fabric woven from an acrylonitrile copolymer fiber sold by Dow Chemical Company under the trademark "Dow 507" were weighed and immersed in a solution of 5 pbw, NaOH, 60 pbw cyanoguanidine, and 400 pbw triethylene glycol at 140° C. The following table gives the immersion time and % weight gain.

| Time (hours) | Weight Gain (%) |
| --- | --- |
| 2 | 1.94 |
| 4 | 2.70 |
| 6 | 4.36 |
| 10 | 6.30 |
| 18 | 13.15 |

EXAMPLE 3

A sample of fabric woven from a polyacrylonitrile fiber sold by Dupont under the trademark "Orlon" was immersed in N-methyl pyrrolidone at 80° to 90° C. The sample dissolved completely.

A second sample was immersed in a 25% solution of cyanoguanidine in N-methyl pyrrolidone at containing 2% by weight NaOH 80° to 90° C. This sample did not dissolve. It is believed that the formation of triazine rings on the polymer insolubilized it.

EXAMPLE 4

A sample of a white fabric woven from an acrylonitrile polymer fiber sold by Dupont under the trademark "Orlon" was immersed in a solution of 25% by weight cyanoguanidine in 75% N-methyl pyrrolidone containing 2% NaOH at 80° C. The fabric became orange, then brown, indicating that it was reacting.

EXAMPLE 5

Samples of a fabric made from "Dow 507" fibers were weighed and immersed in a solution of 25 gm cyanoguanidine in 100 gms morpholine. The following table gives the immersion time and percent weight gain.

| Time (hours) | Weight Gain (%) |
| --- | --- |
| 1 | 0.25 |
| 2 | 0.96 |
| 3 | 1.32 |
| 4 | 2.43 |
| 5 | 3.32 |
| 6 | 4.17 |
| 8 | 4.41 |
| 10 | 4.86 |

The samples seemed to stabilize at this weight gain.

EXAMPLE 6

Samples of a fabric made from "Acrilan" fibers were weighed and immersed in a solution of 5 pbw NaOH, 60 pbw cyanoguanidine, and 400 pbw triethylene glycol at 140° C.

| Time (hours) | Weight Gain (%) |
| --- | --- |
| 2½ | 5.71 |
| 4½ | 9.78 |
| 6½ | 17.76 |
| 8½ | 20.80 |
| 12½ | 36.60 |

The odor of ammonia indicated the decomposition of the cyanoguanidine at this temperature.

EXAMPLE 7

A fabric made from "Verel" fibers immersed in the same solution used in Example 6 at 60° C. gained about 4 to 4.5% in 2 hours.

I claim:

1. A method of making a non-pulverulent solid polymeric structure, of acrylonitrile or a copolymer thereof, which has at least one pendant diaminotriazine ring comprising immersing a non-pulverulent solid polymeric structure of acryllonitrile or a copolymer thereof which has at least one pendant nitrile group into a basic organic solution of cyanoguanidine at a pH of about 8 to about 10 without permitting said polymeric structure to dissolve therein.

2. A method according to claim 1 wherein said structure is washed with water after removal from said solution.

3. A method according to claim 1 wherein said polymeric structure is a fiber.

4. A method according to claim 3 wherein said fiber is woven.

5. A method according to claim 1 wherein said polymeric structure has at least one repeating unit having the general formula

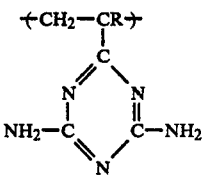

where R is hydrogen or methyl.

6. A method according to claim 5 wherein R is hydrogen.

7. A method according to claim 1 wherein said solution is at about 60° to about 100° C.

8. A method according to claim 1 wherein said solution is made basic with guanidine carbonate.

9. A method of enhancing the fire retardancy of a fibrous material composed of a polymeric structure, of acrylonitrile or a copolymer thereof, having at least one pendant nitrile group, comprising immersing said fibrous material into a basic organic solution of cyanoguanidine at a pH of about 8 to about 10 without permitting said fibrous material to dissolve therein.

* * * * *